US007213757B2

(12) United States Patent
Jones et al.

(10) Patent No.: US 7,213,757 B2
(45) **Date of Patent: *May 8, 2007**

(54) EMERGING SECURITY FEATURES FOR IDENTIFICATION DOCUMENTS

(75) Inventors: Robert L. Jones, Andover, MA (US); Alastair M. Reed, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 383 days.

This patent is subject to a terminal disclaimer.

(21) Appl. No.: 10/941,059

(22) Filed: Sep. 13, 2004

(65) Prior Publication Data

US 2005/0067489 A1 Mar. 31, 2005

Related U.S. Application Data

(63) Continuation-in-part of application No. 10/818,938, filed on Apr. 5, 2004, now Pat. No. 6,996,252, and a continuation-in-part of application No. 10/330,032, filed on Dec. 24, 2003, now Pat. No. 7,063,264, which is a continuation of application No. 09/945,243, filed on Aug. 31, 2001, now Pat. No. 6,718,046.

(60) Provisional application No. 60/507,566, filed on Sep. 30, 2003.

(51) Int. Cl.
*G06K 7/10* (2006.01)

(52) U.S. Cl. ................. 235/462.01; 235/380; 235/487; 382/232

(58) Field of Classification Search ........... 235/462.01, 235/462.04, 491, 487, 380; 382/100, 181, 382/232
See application file for complete search history.

(56) References Cited

U.S. PATENT DOCUMENTS

| | | | |
|---|---|---|---|
| 5,210,411 | A | 5/1993 | Oshima et al. |
| 5,521,722 | A | 5/1996 | Colvill et al. |
| 5,719,948 | A | 2/1998 | Liang |
| 6,115,494 | A | 9/2000 | Sonoda et al. |
| 6,263,438 | B1 | 7/2001 | Walker et al. |

(Continued)

FOREIGN PATENT DOCUMENTS

| | | |
|---|---|---|
| EP | 0 234 885 | 9/1987 |

(Continued)

OTHER PUBLICATIONS

Battiato et al., "Robust Watermarking for Images Based on Color Manipulation," IH/99 LNCS 1768, pp. 302-317, 2000.

(Continued)

*Primary Examiner*—Thien M. Le
*Assistant Examiner*—Edwyn Labaze

(57) ABSTRACT

The present invention provides an emerging security or authentication feature for identification documents and other objects. The security feature is constructed using two differently emission-decaying inks. The inks are arranged so as to convey a first pattern when they are both exited. A second pattern emerges as a first and more rapidly decaying ink decays, but while a second and relatively longer decaying ink still provides emissions. The second pattern can be alphanumeric characters, a barcode, a pattern that will yield a predictable frequency domain representation, a digital watermark, etc. In one implementation, the first pattern is a first machine-readable code and the second pattern is a second, different machine-readable code.

31 Claims, 4 Drawing Sheets

U.S. PATENT DOCUMENTS

| | | | | |
|---|---|---|---|---|
| 6,314,192 | B1 | 11/2001 | Chen et al. | |
| 6,320,675 | B1 | 11/2001 | Sakaki et al. | |
| 6,332,031 | B1 | 12/2001 | Rhoads et al. | |
| 6,332,194 | B1 | 12/2001 | Bloom et al. | |
| 6,334,187 | B1 | 12/2001 | Kadono | |
| 6,373,965 | B1 * | 4/2002 | Liang | 382/112 |
| 6,374,965 | B1 | 4/2002 | Connolly | |
| 6,390,362 | B1 | 5/2002 | Martin | |
| 6,394,358 | B1 | 5/2002 | Thaxton et al. | |
| 6,402,986 | B1 | 6/2002 | Jones, II et al. | |
| 6,441,380 | B1 | 8/2002 | Lawandy | |
| 6,481,753 | B2 | 11/2002 | Van Boom et al. | |
| 6,578,712 | B2 | 6/2003 | Lawandy | |
| 6,590,996 | B1 | 7/2003 | Reed et al. | |
| 6,700,995 | B2 | 3/2004 | Reed | |
| 6,718,046 | B2 | 4/2004 | Reed et al. | |
| 6,721,440 | B2 | 4/2004 | Reed et al. | |
| 6,751,342 | B2 * | 6/2004 | Shepard | 382/141 |
| 6,763,123 | B2 | 7/2004 | Reed et al. | |
| 6,763,124 | B2 | 7/2004 | Alattar et al. | |
| 6,804,377 | B2 | 10/2004 | Reed et al. | |
| 6,832,783 | B2 | 12/2004 | Lawandy | |
| 6,874,639 | B2 | 4/2005 | Lawandy | |
| 6,996,252 | B2 | 2/2006 | Reed et al. | |
| 2001/0030769 | A1 | 10/2001 | Jacobs | |
| 2001/0040980 | A1 | 11/2001 | Yamaguchi | |
| 2001/0053299 | A1 | 12/2001 | Matsunoshita et al. | |
| 2002/0106102 | A1 | 8/2002 | Au et al. | |
| 2003/0005304 | A1 | 1/2003 | Lawandy et al. | |
| 2003/0012562 | A1 | 1/2003 | Lawandy et al. | |
| 2003/0056104 | A1 | 3/2003 | Carr et al. | |
| 2004/0000787 | A1 * | 1/2004 | Vig et al. | 283/113 |

FOREIGN PATENT DOCUMENTS

| | | |
|---|---|---|
| WO | WO 95/13597 | 5/1995 |
| WO | WO 01/08405 | 2/2001 |
| WO | WO 01/39121 | 5/2001 |
| WO | WO 01/73997 | 10/2001 |
| WO | WO 02/21846 | 3/2002 |
| WO | WO 02/23481 | 3/2002 |

OTHER PUBLICATIONS

Bender et al., "Applications for Data Hiding," IBM Systems Journal, vol. 39, Nos. 3&4, 2000, pp. 547-568.

Brownell, "Counterfeiters Dye Over Security Measures," SPIE's OE Magazine, Sep. 2001, pp. 8-9.

Fleet et al., "Embedding Invisible Information in Color Images," Proc. Int. Conf. on Image Processing, vol. 1, pp. 532-535, Oct., 1997.

Hunt, "The Reproduction of Colour in Photography, Printing & Television," 1987, pp. 588, 589 and Plate 35.

Kohda et al., "Digital Watermarking Through CDMA Channels Using Spread Spectrum Techniques," 2000 IEEE, pp. 671-674.

Komatsu et al., "A Proposal on Digital Watermark in Document Image Communication and Its Application to Realizing a Signature," Electronics and Communications in Japan, Part 1, vol. 73, No. 5, 1990, pp. 22-33.

Komatsu et al., "Authentication System Using Concealed Image in Telematics," Memoirs of the School of Science & Engineering, Waseda Univ., No. 52, 1988, pp. 45-60.

ORuanaidh et al, "Watermarking Digital Images for Copyright Protection," www.kalman.mee.tcd.ie/people/jjr/eva.sub.—pap.html, Feb. 2, 1996, 8 pages.

Piva et al., "Exploiting the Cross-Correlation of RGB-Channels for Robust Watermarking of Color Images," 1999 IEEE, pp. 306-310.

* cited by examiner

EMERGING SECURITY FEATURES FOR IDENTIFICATION DOCUMENTS

RELATED APPLICATION DATA

This application is a continuation in part of U.S. patent application Ser. No. 10/818,938, filed Apr. 5, 2004, now U.S. Pat. No. 6,996,252 which is a continuation of U.S. patent application Ser. No. 09/945,243, filed Aug. 31, 2001 (now U.S. Pat. No. 6,718,046). This application is also a continuation in part of U.S. patent application Ser. No. 10/330,032, filed Dec. 24, 2002 now U.S. Pat. No. 7,063,264 (published as US 2003-0173406 A1). This application also claims the benefit of U.S. Provisional Application No. 60/507,566, filed Sep. 30, 2003. Each of these patent documents is herein incorporated by reference.

FIELD OF THE INVENTION

The present invention relates to security features for objects like product packaging, banknotes, checks, labels and identification documents.

BACKGROUND AND SUMMARY OF THE INVENTION

The present invention provides covert features to aid in the security or authentication of objects. The features can be conveyed through ink or dye which appear invisible (or at least generally imperceptible) to a human viewer under normal or ambient lighting conditions. The ink or dye fluoresces or become visibly perceptible by a human viewer under non-visible lighting conditions like ultraviolet (UV) and infrared (IR).

Some of these inks or dyes are designed to fluoresce, after non-visible light illumination, according to a predetermined decay rate. That is to say that inks and dyes can be designed to have different emission decay rate characteristics. When two or more of such predictably decaying inks are used in concert, the security or authentication of an object is greatly enhanced as taught herein.

For the purposes of this disclosure, identification documents are broadly defined and may include, e.g., credit cards, bank cards, phone cards, passports, driver's licenses, network access cards, employee badges, debit cards, security cards, visas, immigration documentation, national ID cards, citizenship cards, social security cards, security badges, certificates, identification cards or documents, voter registration cards, police ID cards, border crossing cards, legal instruments or documentation, security clearance badges and cards, gun permits, gift certificates or cards, labels or product packaging, membership cards or badges, etc., etc. Also, the terms "document," "card," and "documentation" are used interchangeably throughout this patent document. Identification documents are also sometimes referred to as "ID documents."

Identification documents can include information such as a photographic image, a bar code (e.g., which may contain information specific to a person whose image appears in the photographic image, and/or information that is the same from ID document to ID document), variable personal information (e.g., such as an address, signature, and/or birth date, biometric information associated with the person whose image appears in the photographic image, e.g., a fingerprint), a magnetic stripe (which, for example, can be on a side of the ID document that is opposite a side with a photographic image), and various designs (e.g., a security pattern like a printed pattern including a tightly printed pattern of finely divided printed and unprinted areas in close proximity to each other, such as a fine-line printed security pattern as is used in the printing of banknote paper, stock certificates, and the like). Of course, an identification document can include more or less of these types of features.

One exemplary ID document comprises a core layer (which can be pre-printed), such as a light-colored, opaque material, e.g., TESLIN, which is available from PPG Industries) or polyvinyl chloride (PVC) material. The core can be laminated with a transparent material, such as clear PVC to form a so-called "card blank". Information, such as variable personal information (e.g., photographic information, address, name, document number, etc.), is printed on the card blank using a method such as Dye Diffusion Thermal Transfer ("D2T2") printing (e.g., as described in commonly assigned U.S. Pat. No. 6,066,594, which is herein incorporated by reference), laser or inkjet printing, offset printing, etc. The information can, for example, include an indicium or indicia, such as the invariant or nonvarying information common to a large number of identification documents, for example the name and logo of the organization issuing the documents.

To protect the information that is printed, an additional layer of transparent overlaminate can be coupled to the card blank and printed information, as is known by those skilled in the art. Illustrative examples of usable materials for overlaminates include biaxially oriented polyester or other optically clear durable plastic film.

One type of identification document 100 is illustrated with reference to FIG. 1. The identification document 100 includes a security feature 102. The security feature 102 can be printed or otherwise provided on a substrate/core 120 or perhaps on a protective or decorative overlaminate 112 or 112'. The security feature need not be provided on the "front" of the identification document 100 as illustrated, but can alternatively be provided on a backside of the identification document 100. The identification document 100 optionally includes a variety of other features like a photograph 104, ghost or faint image 106, signature 108, fixed information 110 (e.g., information which is generally the same from ID document to ID document), other machine-readable information (e.g., bar codes, 2D bar codes, optical memory) 114, variable information (e.g., information which generally varies from document to document, like bearer's name, address, document number) 116, etc. The document 100 may also include overprinting (e.g., DOB over image 106) or microprinting (not shown).

Of course, there are many other physical structures/materials and other features that can be suitably interchanged for use with the identification documents described herein. The inventive techniques disclosed in this patent document will similarly benefit these other documents as well.

According to one aspect of the present invention, an identification document includes at least one of a photographic representation of a bearer of the identification document and indicia provided on the identification document. The identification document further includes a security feature. The security feature has: i) a first set of elements provided on a surface of the identification document by a first ink, the first ink including a first emission decay rate; and ii) a second set of elements provided on the surface of the identification document by a second ink, the second ink including a second emission decay rate. The first emission decay rate is relatively shorter than the second emission decay rate. And the first set of elements and second set of elements are arranged on the surface of the identification document so as to collectively convey a first pattern when a first non-visible light excites the first ink and the second ink. The second set of elements conveys a second pattern that becomes distinguishable as emissions from the first ink decay, but before emissions from the second ink are extinguished.

Another aspect of the present invention is a method to detect a security feature provided on an identification document. The security feature includes a first set of elements printed on a surface of the identification document with first ink and a second set of elements printed on the surface of the identification document with second ink. The second ink includes an emission decay time that is longer than an emission decay time of the first ink. The method includes the steps of: i) exciting the first ink and the second ink; and ii) observing at least a predetermined characteristic of the security feature after emissions from the first ink fall to a first level and before emissions from the second ink fall to a second level.

Still another aspect of the present invention is a method of providing a security feature for a physical object. The method includes: i) arranging a first set of elements on a surface of the physical object via a first ink, the first ink comprising a first emission decay rate; and ii) arranging a second set of elements on a surface of the physical object via a second ink, the second ink comprising a second emission decay rate. The second emission decay rate is relatively longer than the first emission decay rate. The first set of elements are arranged so as to cooperate with the second set of elements to convey a first pattern through emissions of the first ink and the second ink, and the second set of elements are arranged so as convey a second pattern which becomes distinguishable after emissions from the first ink reach a first level but before emissions from the second ink are extinguished.

The foregoing and other features, aspects and advantages of the present invention will be even more readily apparent from the following detailed description, which proceeds with reference to the accompanying drawings.

DETAILED DESCRIPTION

Inks and dyes have emerged with unique fluorescing (or emission) properties. Some of these properties include varying the frequency of light needed to activate the ink and the color of the ink's resulting fluorescence or emissions. These inks are typically excited with ultraviolet (UV) light or infrared (IR) light and emit in the UV, IR or visible spectrums. For example, ink can be excited with UV light and fluoresce a visible color (or become visible) in the visible spectrum. Different ink can be excited with UV or IR light and fluoresce (or emit) in the UV or IR spectrums. These inks are generally invisible when illuminated with visible light, which makes them ideally suited for covert applications such as copy control or counterfeit detection. Exemplary inks and fluorescing materials are available, e.g., from PhotoSecure in Boston, Mass., USA, such as those sold under the trade name SmartDYE™. Other cross-spectrum inks (e.g., inks which, in response to illumination in one spectrum, activate, transmit or emit in another spectrum) are available, e.g., from Gans Ink and Supply Company in Los Angeles, Calif., USA. Of course other ink or material evidencing these or similar properties can be suitably interchanged herewith.

Some of these inks will exhibit variable fluorescence or emission decay times. Typical decay times can be varied from less than a microsecond to several seconds and more. A CCD scanner and microprocessor can measure the decay emissions from the inks and dyes. Other optical capture devices (cameras, digital cameras, optically filtered receptors (e.g., to pick up IR or UV) web cameras, etc.) can be suitably interchanged with a CCD scanner. These inks and dyes (sometimes both hereafter referred to as "ink") may also include unique emission characteristics, such as emitting in a particular frequency band, which allows for frequency-based detection, or emitting only after being activated by illumination within a particular frequency band. These inks are packaged to be printed using conventional printing techniques, like dye diffusion thermal transfer (D2T2), thermal transfer, offset printing, lithography, flexography, silk screening, mass-transfer, laser xerography, ink jet, wax transfer, variable dot transfer, and other printing methods by which a fluorescing or emitting pattern can be formed. (For example, a separate dye diffusion panel can include dye having UV or IR properties, or UV or IR materials can be incorporated into an existing color panel or ribbon. A UV material can also be imparted via a mass transfer panel (or thermal mass transfer) panel. Of course, UV or IR materials can be providing or incorporated with conventional inks/dyes for other printing techniques as well.)

Figure 1:
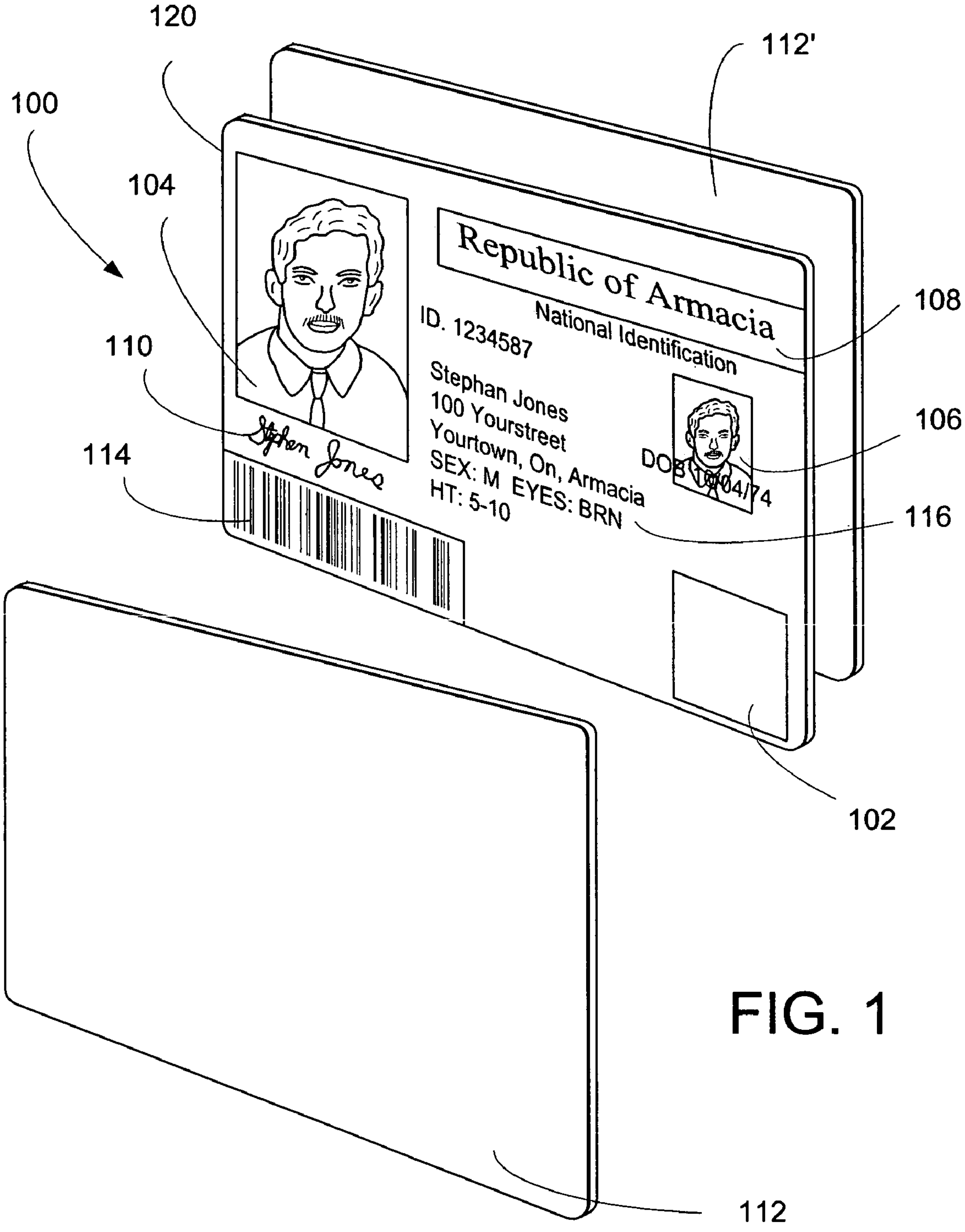
FIG. 1 illustrates an identification document including an emerging security feature.
Figure 2A:
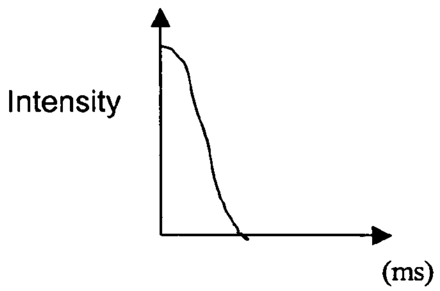
FIG. 2*a* is a graph showing a relatively short fluorescence decay time.
Figure 2B:
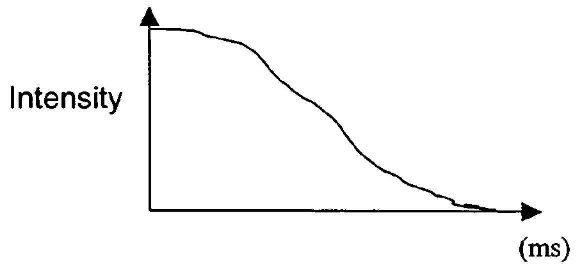
FIG. 2*b* is a graph showing a relatively longer fluorescence decay time.

The present invention utilizes inks having different, yet generally predictable emission decay times. In layman's terms, emission decay times are related to how long an ink's fluorescence or emissions take to "fade." The inks are used to convey security or authentication features for identification documents (e.g., feature 102 in FIG. 1). An inventive feature preferably includes at least a first component and a second component. The first component is printed with ink having a relatively short fluorescence or emission decay time as shown in FIG. 2*a* ("short decay ink"). The decay time extinction shown in FIG. 2*a* preferably ranges from less than 1 millisecond (ms) to about 1 second. Of course this range can be expanded or shortened according to need. The second ink includes a relatively longer fluorescence decay curve as shown in FIG. 2*b* ("long decay ink"). The decay extinction time shown in FIG. 2*b* preferably ranges from several milliseconds (ms) to about 1–3 seconds. Of course this range can be extended or shortened according to need.

The short decay and long decay signals are preferably printed or otherwise applied to an identification document surface to form a security or authentication feature. The inks can be spatially arranged to convey images, codes, designs, artwork, etc. Such a security feature may have a range of unique and desirable properties. For example, a first preferred property is that a security feature, or a characteristic of the security feature, is preferably invisible to a human viewer or at least not generally perceptible when illuminated with visible or ambient light, since the feature is applied with a UV or IR ink having at least some of the characteristics discussed above. A second preferred property is that a characteristic of the security feature is indistinguishable or remains static with steady state (e.g., constant) UV or IR illumination (for simplicity "UV and/or IR" illumination is sometimes hereafter referred to as just as "UV" illumination). This property is even further discussed with reference to the following implementations.

Emerging Security Features

Two or more inks are selectively provided on an identification document to produce an emerging security feature. The term "emerging" implies that the feature becomes visibly apparent (or becomes machine or otherwise detectable) only after termination of UV illumination. Consider the following example with reference to FIGS. 3*a*–3*c*.

A first ink is used to print a first set of elements (e.g., line structures, halftone dots, shapes, characters, etc.). The first ink includes a relatively short decay rate, e.g., like that shown in FIG. 2*a*. A second ink is used to print a second set of elements. The second ink includes a relatively longer decay rate, e.g., like that shown in FIG. 2*b*. The two inks are preferably invisible under ambient lighting conditions, but fluoresce or are otherwise detectable in response to UV illumination. While UV illumination may cause the inks to be detectable in the infrared or ultraviolet spectrums, the inks are preferably detectable in the visible spectrum (e.g., the ink becomes visibly perceptible to a human viewer with appropriate UV illumination).

Figure 3A:
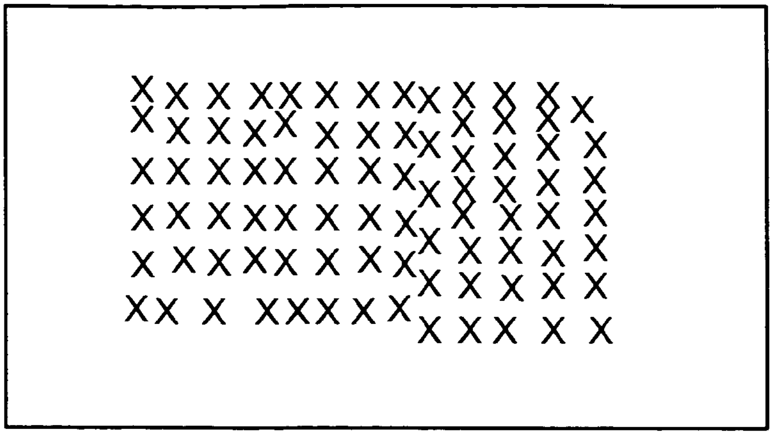
FIGS. 3*a*–3*c* illustrate an emerging security feature.
Figure 3B:
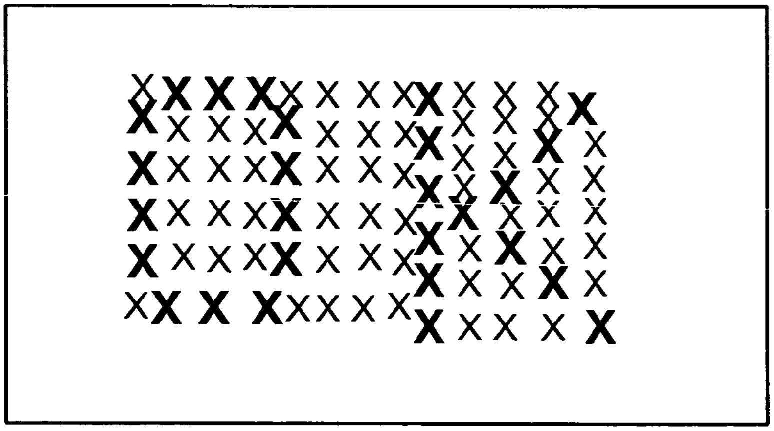
Figure 3C:
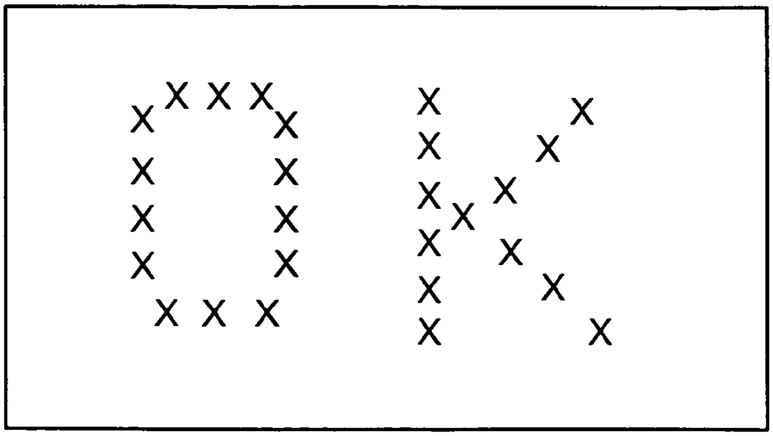

With reference to FIG. 3*a*, a first set of elements and a second set of elements are provide so that in response to UV illumination they both fluoresce to collectively form a solid or other benign pattern. The term "benign" in this context means that the pattern does not convey semantic or other intelligible information. It is also preferably to have the two inks fluoresce the same or similar color to provide a solid color pattern (a solid green or purple fluorescing pattern). A characteristic of the security feature emerges once the UV illumination is terminated. Since the first ink decays at a faster rate in comparison to the second ink, the second set of elements will be visibly perceptible after the first elements fade away (due to emission degradation of the first ink). With reference to FIG. 3*b*, the second set of elements can be arranged in a pattern to convey text (e.g., "OK"), an image, numeric characters, graphics, code or a forensic identifier. A forensic identifier can be uniquely designed to represent a particular manufacture, printing press, jurisdiction, etc. The second set of elements becomes distinguishable as the fluorescence from the ink decays to a first level. The "first level" need not be total emission extinction, and can instead represent a decay level at which the second elements become distinguishable over the first set of elements. The second set of elements continues to fluoresce for a time after illumination extinction (FIG. 3*c*) depending on the second ink's decay rate. Thus, under steady state UV illumination (and typically for a short time thereafter) a characteristic of the security feature is obscured due to the interference of the first and second ink. The characteristic of the security feature becomes visibly perceptible only after the first ink decays to a lower emission level, allowing the second ink to convey a distinguishable pattern.

If the second ink pattern is not found after termination of steady state UV illumination (or after a UV strobe or pulse) the identification document is considered suspect.

Conveying Machine-readable Code with Limited Windows of Detecting Opportunity

Instead of text or graphics the second set of elements can be arranged to convey machine-readable code (e.g., 2D barcodes, digital watermarks, pixel groupings or predetermined patterns, and/or data glyphs). The machine-readable code, however, only emerges or becomes distinguishable as the first set of elements fade away. Image data is captured of the security feature after the second set of elements become distinguishable, but before emissions from second ink are extinguished beyond detectable levels.

Image capture or detection timing can be synchronized based on expected decay rates for certain types of documents. The decay rates can be predetermined but still vary, e.g., from jurisdiction (e.g., Canada) to jurisdiction (e.g., USA) or from document type (e.g., passport) to document type (e.g., driver's license). In some implementations the expected timing is determined from a timing clue carried by the document itself. For example, a digital watermark is embedded in a photograph or graphic carried by an identification document. The digital watermark includes a payload, which reveals the expected timing, or a particular frequency of UV illumination needed to excite the first and second ink. Once decoded from the watermark, an illumination source or image capture device uses the timing or illumination clue to help synchronize detection. Even further information regarding digital watermarks is found, e.g., in assignee's U.S. Pat. Nos. 6,122,403 and 6,614,914, which are each herein incorporated by reference. The information can be similarly carried by other machine-readable code like a barcode or data stored in magnetic or optical memory. A machine-readable detector (e.g., barcode reader or digital watermark reader) analyzes captured image data to detect the machine-readable code.

Thus, a machine-readable code is readable only during a window starting after emissions of the first ink fall to a level where the second ink is distinguishable, but before the emissions from the second ink are extinguished beyond detectable levels. Since a security feature may include a machine-readable code, the first and second ink decay rates can be closely matched so as to provide a very narrow detection window. The window may not even be perceptible to the human eye, while still being sufficient to yield a machine-read.

Figure 4:
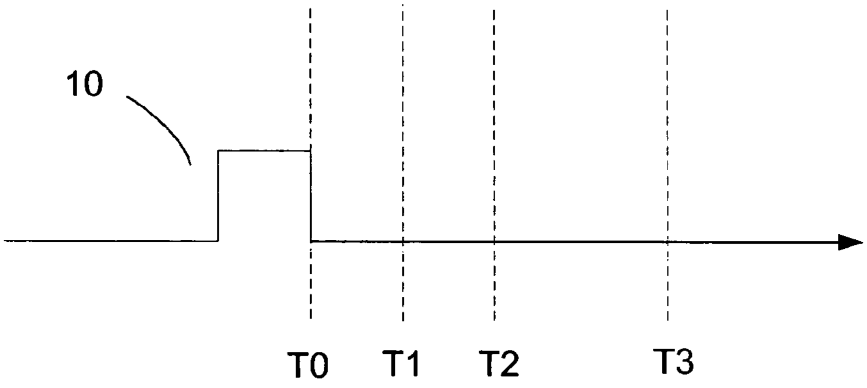
FIG. 4 illustrates relative timing for an illumination pulse.

A further example for detecting machine-readable code conveyed by two or more decaying inks is discussed with reference to FIGS. 4 and 5. Synchronizing detection with illumination greatly enhances detection. In one implementation a pulse 10 of UV illumination as shown in FIG. 4 excites two inks. The inks begin their emission decay at T0 or near to the falling edge of the UV pulse. The first ink (short decay) emissions decay in a relatively short time (T1) as shown by the dotted curve in FIG. 5. The second ink (long decay) emissions decay in a relatively longer time (T3) as shown by the solid curve in FIG. 5. A characteristic (e.g., machine-readable code) of the security feature is detectable from the longer decaying ink after emissions from the first ink decay (T1), but before emissions from the second ink decay (T3). The characteristic is detectable in this T1–T3 range since it becomes distinguishable over the short decay ink. Of course, the characteristic may be more readily detected in a range of T1–T2, due to emission strength in this range. In alternative cases, the T1 and T3 points mark predetermined decay levels, instead of emission extinction points. For example, at T1 the short decay ink may have decayed to a first level. This first level may correspond with a level at which the characteristic becomes distinguishable.

Figure 5:
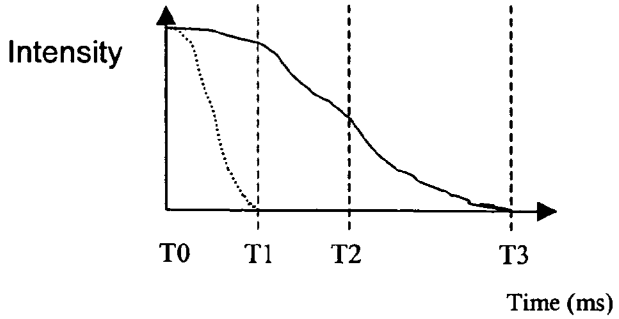
FIG. 5 is a graph showing relative decay times in relation to the decay times shown in FIGS. 2*a* and 2*b* and relative to the pulse timing shown in FIG. 4.

A camera (or CCD sensor) can be gated or enabled (e.g., operating during the T1–T2 time range shown by the dashed lines in FIG. 5) to capture emissions after the short decay time ink decays (T1), but while the long decay time ink is still emitting (until T3). (Alternatively, an optical sensor continuously captures emissions until a machine-readable characteristic of the feature signal is detected.). The machine-readable feature can be detected and decoded from this captured image. Of course, a gated timing range can be varied to match ink delay times and may even be varied as part of a security measure. For example, ink decay time (or the relative decay window between the first and second ink) can be maintained in secrecy or can be randomly varied. The gating times can also be calibrated or set based on information carried by an identification document (e.g., information carried by a digital watermark or barcode). The particular gating window is then supplied to a reader for detection synchronization.

Using a machine-readable code as an emerging characteristic of a security feature provides another opportunity to discuss that machine-readable detection, although preferred, need not be performed in a visible spectrum (e.g., illuminating in a non-visible spectrum and detecting with a visible receptor). Instead, a machine-readable code can be detected in an infrared or ultraviolet spectrum, using a conventional infrared or ultraviolet light detector.

Static Security Feature Emerging as Dynamic Features

Instead of a solid or benign pattern, as shown in FIG. 3*a*, a first set of elements and second set of elements are provided on an identification document to collectively form, through their fluorescence, a message or machine-readable code. For example, in FIG. 6*a*, the first and second elements collectively convey a first 1D-barcode under appropriate illumination. The message or machine-readable code is preferably detectable under steady state UV illumination (and for shortly thereafter depending on decay rates). A detector (e.g., barcode reader) reads the message or machine-readable code.

One inventive aspect is that the message or machine-readable code changes as the first ink decays to a level where the second ink becomes distinguishable. That is, the second set of elements are arranged so as to help the first set of elements convey first data—when both inks fluoresce together. But the second set of elements—by itself—conveys second data which becomes distinguishable over the first data as the first ink decays. For example, with reference to FIG. 6*b*, the second set of elements conveys a second barcode, which becomes distinguishably detectable as the first ink decays. Some care is taken to ensure that the spatial arrangement of the second ink contributes to the first code, while being able to solely convey the second code. This task is simplified with conventional error correction techniques and/or redundantly conveying of the first and second data. Different reading protocols can be used to decipher the first and second codes—which may provide some flexibility in spatially arranging the different sets of elements to convey separate codes.

Figure 6A:
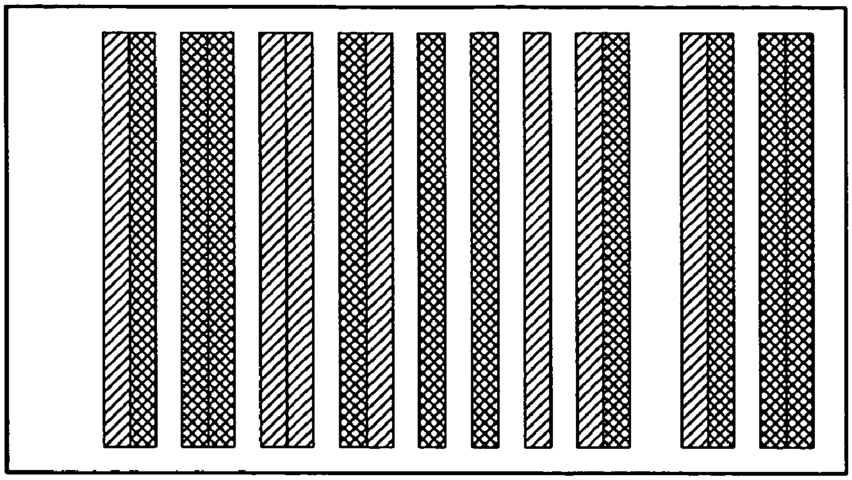
FIGS. 6*a* and 6*b* illustrate an emerging security feature in the form of an evolving machine-readable code.
Figure 6B:
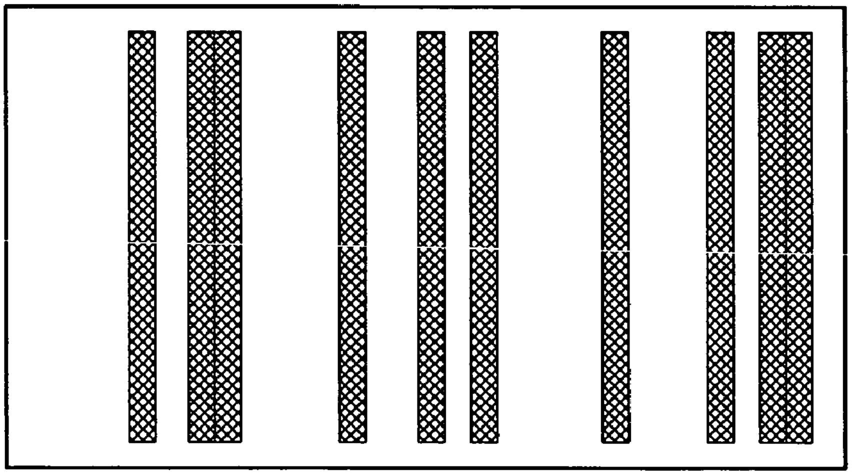

While simple 1-D barcodes are used to illustrate this inventive aspect in FIGS. 6*a* and 6*b*, the present invention also contemplates that 2D barcodes, digital watermarks and other machine-readable code will benefit from these techniques. For example, a first digital watermark signal is generated to convey first data. The first watermark signal is printed on the identification document using relatively long decay ink (e.g., like in FIG. 2*b*). A second digital watermark signal is generated to convey second data. The first digital watermark signal and second digital watermarks are compared, and it is determined how a second and relatively short decaying ink (e.g., like in FIG. 2*a*) must be printed on the identification document so as to yield a read of the second data when the first and second inks are both fluorescing. This concept is relatively straightforward when the digital watermarking techniques convey data through luminance variations. The second ink is arranged so that, when in cooperation with the first ink, the net luminance variations only convey the second data under steady state UV illumination. The first digital watermark become distinguishable—and thus detectable—as the second ink fades after UV illumination terminates. Here again, error correction coding and redundant embedding—particularly for the second digital watermark—can help ensure that both messages are detectable, but during different timing windows. Of course these techniques are readily applicable to other digital watermarking techniques as well.

Instead of a watermark or barcode, two patterns can be provided on the document through first (short decay) and second (long decay) ink. The first pattern is conveyed through the fluorescing of both the first and second ink. The second pattern is distinguishable as the first ink fades or extinguishes. The patterns may include images, designs, a predetermined relationship between points, or may even convey a pattern that has frequency domain significance (e.g., like a pattern of concentric circles). A pattern-matching module can analyze scan data associated with the pattern (or a frequency domain representation of the scan data) to see if the pattern matches a predetermined pattern.

Concluding Remarks

The foregoing are just exemplary implementations of the present invention. It will be recognized that there are a great number of variations on these basic themes. The foregoing illustrates but a few applications of the detailed technology. There are many others.

The section headings in this application are provided merely for the reader's convenience, and provide no substantive limitations. Of course, the disclosure under one section heading may be readily combined with the disclosure under another section heading.

To provide a comprehensive disclosure without unduly lengthening this specification, each of the above-mentioned patent documents is herein incorporated by reference. The particular combinations of elements and features in the above-detailed embodiments are exemplary only; the interchanging and substitution of these teachings with other teachings in this application and the incorporated-by-reference patents/applications are also contemplated.

While the preferred implementation has been illustrated with respect to an identification document the present invention is not so limited. Indeed, the inventive methods can be applied to other types of objects as well, including, but not limited to: checks, traveler checks, banknotes, legal documents, printed documents, in-mold designs, printed plastics, product packaging, labels and photographs.

As mentioned above the use of the term “UV ink” is sometimes used to mean an ink that is excited by UV or IR and emits in either of the UV, IR or visible spectrums. Thus, while the disclosure uses terms like “fluoresce” to sometimes describe emissions, the reader should not assume that UV ink emissions are limited to detection in the visible spectrum; but, instead, some UV inks may produce emissions that are detected in either the UV or IR spectrums upon appropriate excitation.

A few additional details regarding digital watermarking are provided for the interested reader. Digital watermarking technology, a form of steganography, encompasses a great variety of techniques by which plural bits of digital data are hidden in some other object, preferably without leaving human-apparent evidence of alteration. Digital watermarking may be used to modify media content to embed a machine-readable code into the media content. The media may be modified such that the embedded code is imperceptible or nearly imperceptible to the user, yet may be detected through an automated detection process. Most commonly, digital watermarking is applied to media signals such as images, audio, and video signals. However, it may also be applied to other types of media, including documents (e.g., through line, word or character shifting, through texturing, graphics, or backgrounds, etc.), software, multi-dimensional graphics models, and surface textures of objects, etc. There are many processes by which media can be processed to encode a digital watermark. Some techniques employ very subtle printing, e.g., of fine lines or dots, which has the effect slightly tinting the media (e.g., a white media can be given a lightish-green cast). To the human observer the tinting appears uniform. Computer analyses of scan data from the media, however, reveals slight localized changes, permitting a multi-bit watermark payload to be discerned. Such printing can be by ink jet, dry offset, wet offset, xerography, etc. Other techniques vary the luminance or gain values in a signal to embed a message signal. The literature is full of other well-known digital watermarking techniques. For example, other techniques alter signal characteristics (e.g., frequency domain or wavelet domain characteristics) of a host signal to embed plural-bit information.

Digital watermarking systems typically have two primary components: an embedding component that embeds the watermark in the media content, and a reading component that detects and reads the embedded watermark. The embedding component embeds a watermark pattern by altering data samples of the media content or by tinting as discussed above. The reading component analyzes content to detect whether a watermark pattern is present. In applications where the watermark encodes information, the reading component extracts this information from the detected watermark.

The term "decay" is broadly used throughout this patent document. For instance, decay may imply that fluorescence or emissions are extinguished. Or decay may imply that such have fallen below a threshold level (e.g., based on detection or interference levels). In some cases, decay implies that fluorescence or emissions have started to decay, such as after a falling edge of a UV pulse.

The above-described methods and functionality can be facilitated with computer executable software stored on computer readable media, such as electronic memory circuits, RAM, ROM, magnetic media, optical media, memory sticks, hard disks, removable media, etc., etc. Such software may be stored and executed on a general-purpose computer, or on a server for distributed use. Instead of software, a hardware implementation, or a software-hardware implementation can be used.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

What is claimed is:

1. An identification document comprising at least one of a photographic representation of a bearer of said identification document or indicia provided on the document, said identification document further comprising a security feature including:

a first set of elements provided on a surface of the identification document by a first ink, the first ink including a first emission decay rate;

a second set of elements provided on the surface of the identification document by a second ink, the second ink including a second emission decay rate, wherein the first emission decay rate is relatively shorter than the second emission decay rate; and wherein the first set of elements and second set of elements are arranged on the surface of the identification document so as to collectively convey a first pattern when the first ink and the second ink are excited by non-visible light, wherein the second set of elements convey a second pattern that becomes distinguishable as emissions from the first ink decay but before the emissions from the second ink are extinguished.

2. The identification document of claim 1, wherein the non-visible light comprises ultraviolet light.

3. The identification document of claim 1, wherein the non-visible light comprises infrared light.

4. The identification document of claim 1, wherein the emissions from the first ink and the second ink are visibly perceptible by a human viewer of the first pattern and emissions from the second ink are visibly perceptible by a human viewer of the second pattern, and wherein the first ink and second ink are generally imperceptible to a human viewer absent illumination by the non-visible light.

5. The identification document of claim 4, wherein the first pattern is visibly perceptible by a human viewer during illumination by the non-visible light and for at least a period of time following such illumination, and wherein the second pattern is distinguishable by a human viewer only after the illumination by the non-visible light is extinguished and the emissions from the first ink decay to at least a first level.

6. The identification document of claim 1, wherein the first pattern is conveyed during illumination by the non-visible light and for at least for a period of time following such illumination, and wherein the second pattern is distinguishable only after the illumination by the non-visible light is extinguished.

7. The identification document of claim 1, wherein the first pattern comprises at least one of a solid pattern or a benign pattern.

8. The identification document of claim 7, wherein the second pattern comprises at least one pattern from a group of patterns comprising: alphanumeric characters, a design, an image, a code and a symbol.

9. The identification document of claim 1, wherein the first pattern comprises a first barcode including first auxiliary data, and wherein the second pattern comprises a second barcode including second auxiliary data, and wherein at least some of the second auxiliary data is different than the first auxiliary data.

10. The identification document of claim 1, wherein the second pattern comprises a machine-readable code.

11. The identification document of claim 10, wherein the machine-readable code comprises a digital watermark including a first message.

12. The identification document of claim 11, wherein the first pattern comprises a digital watermark including a second message, wherein at least some of the first message is different from the second message.

13. The identification document of claim 10, wherein the machine-readable code comprises at least one of a 1D-barcode or 2D-barcode.

14. The identification document of claim 1, wherein the indicia comprises at least one item from a group of items comprising: text, numbers, machine-readable code, design and image.

15. A method to detect a characteristic of a security feature provided on an identification document, the security feature comprising a first set of elements printed on a surface of the identification document with a first ink and a second set of elements printed on the surface of the identification document with a second ink, the second ink comprising an emission decay time that is longer than an emission decay time of the first ink, said method comprising:

exciting the first ink and the second ink; and observing at least a characteristic of the security feature after emissions from the first ink fall to a first level and before emissions from the second ink fall to a second level.

16. The method of claim 15, wherein the characteristic of the security feature is observed through detection of ultraviolet or infrared emissions.

17. The method of claim 15, wherein the characteristic of the security feature is visually observable by a human viewer.

18. The method of claim 15, wherein the characteristic is only observable after emissions from the first ink fall to a first level and before emissions from the second ink fall to a second level.

19. The method of claim 18, wherein the predetermined characteristic of the security feature is at least one of alphanumeric characters, a design, an image, a code or a symbol.

20. The method of claim 18, wherein the characteristic of the security feature comprises a machine-readable code.

21. The method of claim 20, wherein the machine-readable code comprises steganographic encoding.

22. The method of claim 21, wherein the steganographic encoding comprises digital watermarking.

23. A method of providing a security feature for a physical object, said method comprising:

arranging a first set of elements on a surface of the physical object via a first ink, the first ink comprising a first emission decay rate; and arranging a second set of elements on a surface of the physical object via a second ink, the the second ink comprising a second emission decay rate, wherein the second emission decay rate is relatively longer than the first emission decay rate, and wherein the first set of elements are arranged so as to cooperate with the second set of elements to convey a first pattern formed by emissions of the first ink and the second ink, and the second set of elements are arranged so as convey a second pattern which becomes distinguishable after emissions from the first ink reach a first level but before emissions from the second ink are extinguished.

24. The method of claim 23, wherein the physical object comprises an identification document.

25. The method of claim 23, wherein the first ink and the second ink produce emissions with exposure to at least one of ultraviolet light or infrared light.

26. The method of claim 25, wherein the first pattern is visibly perceptible to a human viewer.

27. The method of claim 26, wherein the first pattern is visibly perceptible by a human viewer during both illumination by the non-visible light and for at least a period of time following such illumination, and wherein the second pattern is distinguishable by a human viewer only after illumination by the non-visible light is extinguished and the emissions from the first ink decay to at least to the first level.

28. The method of claim 26, wherein the first pattern comprises at least one of a solid pattern or a benign pattern.

29. The method of claim 28, wherein the second pattern comprises at least one of alphanumeric characters, a design, an image, a code or a symbol.

30. The method of claim 23, wherein the second pattern comprises a machine-readable code.

31. An identification document comprising at least one of a photographic representation of a bearer of said identification document or indicia provided thereon, said identification document further comprising a security feature including: i) a first set of elements provided on a surface of the identification document by a first ink, the first ink including a first emission decay rate; ii) a second set of elements provided on the surface of the identification document by a second ink, the second ink including a second emission decay rate, wherein the first emission decay rate is relatively shorter than the second emission decay rate, and wherein the first set of elements and second set of elements are arranged on the surface of the identification document so as to collectively convey a first pattern when the first ink and the second ink are excited by a non-visible light, with the second set of elements conveying a second pattern that becomes distinguishable as emissions from the first ink decay but before the emissions from the second ink are extinguished, said document further comprising a machine-readable code that is detectable with visible light scanning of the document, the machine readable code conveying at least one of: i) the presence of the second pattern; ii) a frequency or range of frequencies of the non-visible light; or information corresponding to, or being redundant with, the first pattern or second pattern.

* * * * *

UNITED STATES PATENT AND TRADEMARK OFFICE

CERTIFICATE OF CORRECTION

PATENT NO. : 7,213,757 B2
APPLICATION NO. : 10/941059
DATED : May 8, 2007
INVENTOR(S) : Robert L. Jones and Alastair M. Reed It is certified that error appears in the above-identified patent and that said Letters Patent is hereby corrected as shown below:

Item 63, Related U.S. Application Data, please delete and insert the following:

Related U.S. Application Data

(63) --Continuation-in-part of U.S. patent application Ser. No. 10/818,938, filed Apr. 5, 2004, now Pat. No. 6,996,252, which is a continuation of U.S. patent application Ser. No. 09/945,243, filed Aug. 31, 2001 (now U.S. Pat. No. 6,718,046). This application is also a continuation-in-part of U.S. patent application Ser. No. 10/330,032, filed Dec. 24, 2002 (now U.S. Pat. No. 7,063,264).--

Signed and Sealed this
Twelfth Day of March, 2013

Teresa Stanek Rea
*Acting Director of the United States Patent and Trademark Office*